P. RITCHEY.
Corn Planter.
No. {1,080, 32,084.}
Patented Apr. 16, 1861.
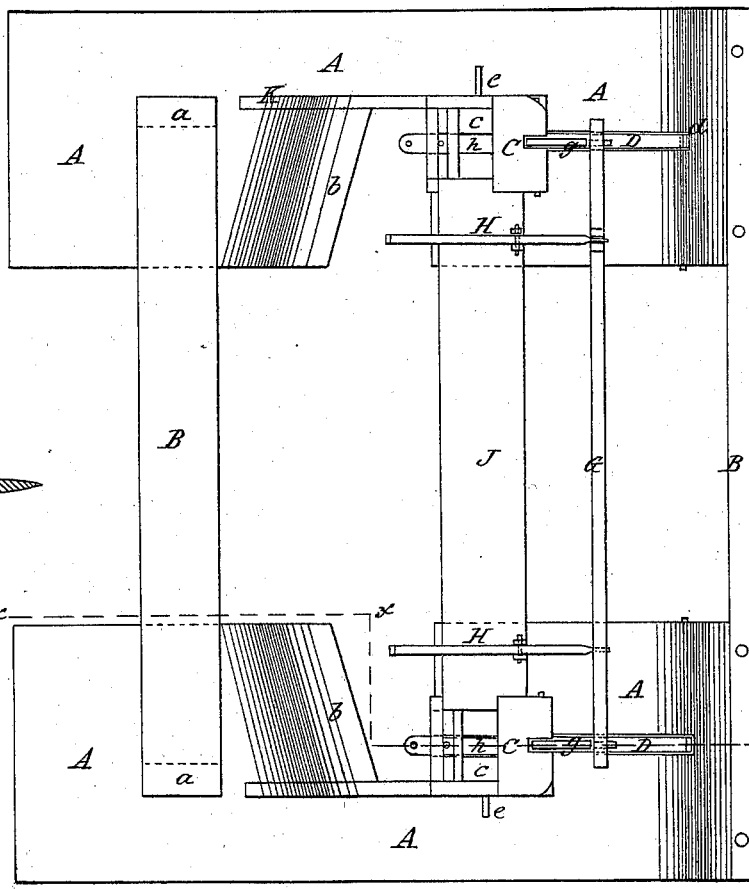
Witnesses:
J. W. Coombs
R. S. Spence
Inventor:
Peters Ritchey
per Munn & Co
Attorneys

UNITED STATES PATENT OFFICE.

POWERS RITCHEY, OF HAMILTON, ILLINOIS.

IMPROVEMENT IN CORN-PLANTERS.

Specification forming part of Letters Patent No. 32,084, dated April 16, 1861.

*To all whom it may concern:*

Be it known that I, POWERS RITCHEY, of Hamilton, in the county of Hancock and State of Illinois, have invented a new and useful Improvement in Corn-Planters; and I do hereby declare that the following is a full, clear, and exact description thereof, reference being had to the accompanying drawings, making a part of this specification, in which—

Figure 1 is a vertical longitudinal section through the improved corn-planter, as indicated by the course of the red line $x\ x$ in Fig. 2. Fig. 2 is a plan view of the improved machine. Fig. 3 is a section through one of the shoes in the horizontal plane indicated by the red line $y\ y$ in Fig. 1.

Similar letters of reference indicate corresponding parts in all the figures.

To enable those skilled in the art to make and use my invention, I will proceed to describe its construction and operation.

A A are two broad sled-runners, which are turned up at their front ends and connected by a transverse bar, B, in front, and by a transverse seat, B', which is near the rear end of the runners A A. This seat is elevated above the runners and mounted on posts $a\ a$. Near the middle of the length of the runners A A, and on the inside of each runner, is a space, behind which a portion, $b$, of the runner is curved up obliquely, so as to throw all clods of earth and trash between the runners, thus leaving the track of the runners perfectly level and free from such obstructions. These runners A A are intended for leveling the surface of the ground before and after the corn is dropped, and to pack the earth about the corn, leaving it in a fit condition to vegetate.

C C are two seed-boxes, which are arranged at the rear edges of the front portions of the runners A A, as shown in Figs. 1 and 2 of the drawings, and the bottoms $c\ c$ of the seed-boxes are elevated some distance above the top of the sled-runners for the purpose of allowing the shoes or openers D D to be adjusted vertically at their rear ends. These shoes D D are intended for opening the furrows into which the corn is dropped, and to be adjustable at their rear ends, so that they can be set to form furrows of any desired depth. These shoes D D are narrow pieces of wood with their lower edges curved and sharpened, so that they will enter the loose earth freely and leave behind them narrow channels. The shoes are pivoted at their front ends to the front part of the runners at $d\ d$ and extend back through longitudinal slots, which are formed in the runners, to the rear ends of the front portions of the runners A A, as shown in Fig. 1 of the drawings, and these shoes are again attached to the sides of the seed-boxes C by pins $e\ e$, which pass transversely through the sides of the seed-boxes and through the shoes. The rear ends of the wood part of the shoes D D do not extend behind the holes in the bottoms of the hoppers, but on each side of the shoes wings (metal plates) $f\ f$, Fig. 3, are secured, which project out behind the ends of the shoes and form channels for conducting the grains of corn from the seed-boxes down into the furrows. Above the holes in the shoes through which the pins $e\ e$ pass there are made other holes, $e'$, which will allow the shoes to be depressed at their rear ends and secured by the pins $e\ e$, for making a deeper channel in the earth, according to the nature of the soil in which the corn is to be planted.

The seed-boxes C C have common seed-slides $h\ h$ passing longitudinally through them, which are pivoted at their front ends, outside of the boxes, to the lower arms of the triangular levers $g\ g$, which have their fulcra in the tops of the seed-boxes. The upper arms of these levers $g\ g$ are pivoted to the extreme ends of a horizontal transverse bar, G, to which the front ends of two hand-levers, H H, are pivoted. The fulcra of these levers H H are on the transverse bar J, which extends from one seed-box to the other. By raising and depressing the arms of levers H H the seed-slides will each receive a reciprocating motion and alternately drop the desired number of grains of corn down behind the shoes D D into the channels formed in the ground by these shoes.

The seed-dropping device is in many respects similar to planters now in use where seed-slides are employed.

K K are pins, which are secured rigidly to and project down from the bottom of the runners A A, and serve to press the earth over the corn, and to cover the corn. These pins are arranged a little to one side of the line of the furrows, and as they are drawn through the ground they close up the seed-channel tightly with earth, after which the bottom surfaces of the rear parts of the runners level and press the earth down over the seed.

I am aware that pins or shoes have been used in conjunction with sled-runners for opening the channels to receive the seed, and I do not claim such; but

I claim as my invention and desire to secure by Letters Patent—

The arrangement of the curved runners A A, adjustable pivoted openers D D, and pressers K K with each other and with the seedboxes C C, slides $h$, and levers H H, all as herein shown and described, for the purposes set forth.

POWERS RITCHEY.

Witnesses:
 JOHN S. CURREY,
 R. F. SMITH.